(12) United States Patent  (10) Patent No.: US 8,736,611 B1
Tulasi  (45) Date of Patent: May 27, 2014

(54) ASSIGNING VALUES TO OBJECTS USING A TWO-DIMENSIONAL DATA INPUT PLANE

(75) Inventor: Vinuth Tulasi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 930 days.

(21) Appl. No.: 12/878,768

(22) Filed: Sep. 9, 2010

(51) Int. Cl.
 *G06T 11/20* (2006.01)
(52) U.S. Cl.
 USPC .......................................................... 345/440
(58) Field of Classification Search
 USPC ................................................. 345/440–441
 See application file for complete search history.

(56) References Cited

U.S. PATENT DOCUMENTS

2009/0322527 A1* 12/2009 Crisp et al. ..................... 340/541
2012/0005045 A1*  1/2012 Baker ........................... 705/27.2

OTHER PUBLICATIONS

U.S. Appl. No. 12/688,635, by Uday Kishore Kumbhari, filed Jan. 15, 2010.
U.S. Appl. No. 12/755,269, by Vivek Singh, filed Apr. 6, 2010.
U.S. Appl. No. 12/785,194, by Kent A. Watson, filed May 21, 2010.

* cited by examiner

*Primary Examiner* — Phi Hoang
*Assistant Examiner* — Mohammad H Akhavannik
(74) *Attorney, Agent, or Firm* — Shumaker & Sieffert, P.A.

(57) ABSTRACT

A two-dimensional data input plane represents a set of objects along an x-axis and a set of values that can be assigned to the objects along a y-axis. Plotting a point on the graph causes a value corresponding to the horizontal component of the point to be assigned to an object corresponding to the vertical component of the point. In one example, a device includes a user interface to display a graph, identifiers for a set of objects along an x-axis of the graph, and a set of values along a y-axis of the graph, and a processor to receive a selection of an intersection of one of the identifiers of the objects along the x-axis and one of the values along the y-axis from the user interface, and to assign the one of the values to the one of the objects corresponding to the one of the identifiers.

15 Claims, 8 Drawing Sheets

ASSIGNING VALUES TO OBJECTS USING A TWO-DIMENSIONAL DATA INPUT PLANE

TECHNICAL FIELD

This disclosure relates to computer networks, and more particularly, to management of network devices.

BACKGROUND

A computer network typically includes a collection of interconnected computing devices that exchange data and share resources. The devices may include, for example, web servers, database servers, file servers, routers, printers, end-user computers, PDAs, handhelds and other devices. Accordingly, networks may have a large number of network devices.

Management of a large number of network devices can be difficult. For example, network administrators may establish security domains such that network devices are able to communicate with other devices within the same domain. In addition, network devices within one domain may be prevented from interacting with devices of a different security domain. In order to create such security domains, an administrator individually assigns each of the network devices to one or more security domains. Due to the large number of devices, individual assignment of network devices to security domains can be tedious.

SUMMARY

In general, this disclosure describes techniques for assignment of values to objects using a user-interface in which a single screen presents a two-dimensional assignment plane that allows each of a plurality of objects to be assigned a corresponding and possibly different value with a single click or other user action for each object. The assignment plane of the user interface may simplify the task of assigning values to many different objects, e.g., assigning security domains to different network devices in a large enterprise network using a network management system. The assignment plane presented by the user interface may be particularly useful when large numbers of objects need to be assigned values from a large data set.

As described herein, a domain of objects may be defined to correspond to values along a first dimension (e.g., an x-axis) of the displayed assignment plane, while a range of values to assign to the objects may correspond to values along a second dimension (e.g., a y-axis) of the assignment plane. In this manner, an administrator may simply select a point on the plane presented by the user interface, corresponding to the intersection of an x-value with a y-value, in order to assign the value corresponding to the position of the point along the y-axis to the object corresponding to the position of the point along the x-axis. Thus, the user interface allows the user to make a simple of plotting a point on the graph to assign a value to an object, where the value and the object correspond to the point.

One example for using the assignment plane includes displaying, with a management device, identifiers for network devices to be deployed to an enterprise network along the x-axis and values for security domains within the enterprise network along the y-axis. The administrator may then select a single point on the assignment plane to assign a given device as specified by the corresponding x-value of the point to a given security domain as specified by the corresponding y-value of the point. The administrator may easily repeat this single action to assign each of the network devices to proper security domains. Moreover, the administrator need not be forced to exit the user interface screen and is able to view and modify the current assignment of all the devices with simple interactions with the single interface screen. Once accepted, the management device may automatically generate and deploy configuration data necessary to configure each of the network devices as a member of the assigned security domain.

In one example, a method includes displaying, by a computing device, identifiers for a set of objects along an x-axis of a graph and a set of values along a y-axis of the graph and receiving a selection of an intersection of one of the identifiers along the x-axis and one of the values along the y-axis. The method further includes assigning the selected one of the values to the one of the objects corresponding to the selected one of the identifiers, and sending configuration data to the one of the objects to configure the one of the objects with the selected one of the values.

In another example, a device includes a user interface to display a graph, identifiers for a set of objects along an x-axis of the graph, and a set of values along a y-axis of the graph and a computer-readable medium encoded with instructions for a configuration module and a user interface module. The device further includes a processor to execute the user interface module to receive a selection of an intersection of one of the identifiers of the objects along the x-axis and one of the values along the y-axis from the user interface, to execute the configuration module to assign the selected one of the values to the one of the objects corresponding to the selected one of the identifiers, and to execute the configuration module to send configuration data to the selected one of the objects to configure the selected one of the objects with the selected one of the values.

In another example, a system includes a plurality of managed network devices, and a management device comprising a user interface to display a graph, identifiers for the plurality of managed network devices along an x-axis of the graph, and a set of values along a y-axis of the graph, and a computer-readable medium encoded with instructions for a configuration module and a user interface module. The device further includes a processor to execute the user interface module to receive a selection of an intersection of one of the identifiers of the objects along the x-axis and one of the values along the y-axis from the user interface, to execute the configuration module to assign the selected one of the values to the one of the managed network devices corresponding to the selected one of the identifiers, and to execute the configuration module to send configuration data to the selected one of the managed network devices to configure the selected one of the managed network devices with the selected one of the values.

In another example, a computer-readable medium, such as a computer-readable storage medium, contains, e.g., is encoded with, instructions that cause a programmable processor to display identifiers for a set of objects along an x-axis of a graph and a set of values along a y-axis of the graph, and receive a selection of an intersection of one of the identifiers along the x-axis and one of the values along the y-axis. The computer-readable medium further contains, e.g., is encoded with, instructions that cause a programmable processor to assign the selected one of the values to the one of the objects corresponding to the selected one of the identifiers, and send configuration data to the one of the objects to configure the one of the objects with the selected one of the values.

The techniques of this disclosure may provide one or more advantages. For example, the techniques of this disclosure may allow an administrator to configure a large number of devices. Further, the administrator need not know the details of each object or value within an enterprise, because the management device configures devices automatically connected to the network. Also, the administrator need not know the location of each device or security domain, because the management device is aware of the devices and security domains automatically. The techniques of this disclosure may reduce the time needed to assign a large number of values to a multitude of objects. Also the techniques of this disclosure scale well for assignments between large numbers of objects and values. In this manner, the techniques of this disclosure may reduce the complexity of managing network devices, providing network security, and may reduce the operational costs associated with managing the network.

The details of one or more examples are set forth in the accompanying drawings and the description below. Other features, objects, and advantages will be apparent from the description and drawings, and from the claims.

DETAILED DESCRIPTION

Figure 1:
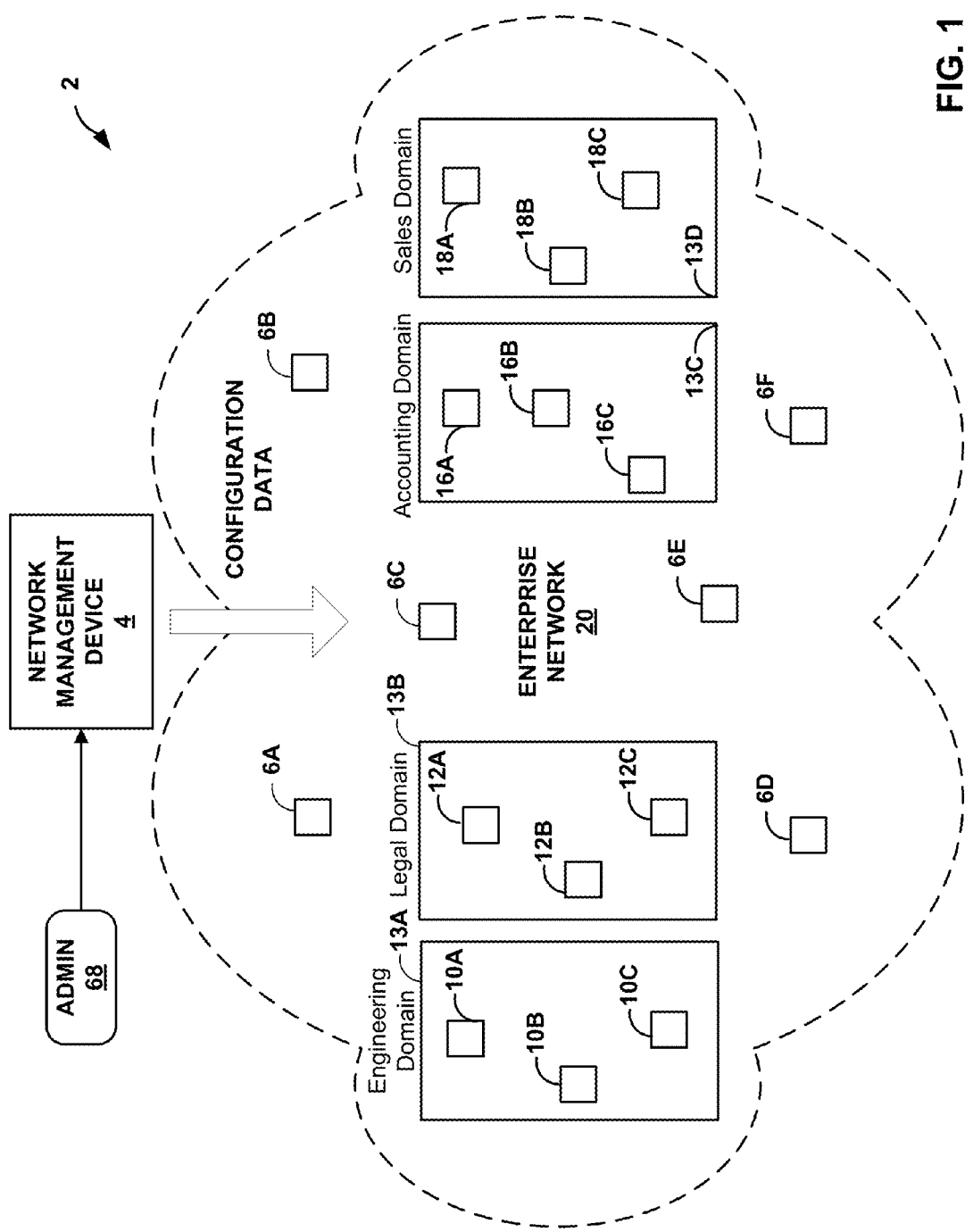
FIG. 1 is a block diagram illustrating an example system in which a management device assigns network devices to one or more security domains using a two-dimensional data input plane.

FIG. 1 is a block diagram illustrating an example system 2 in which management device 4, also referred to as a "network management unit," assigns one or more network devices, such as network devices 6A-6F (network devices 6), to one or more of security domains 13A-13D (security domains 13) using a two-dimensional data input plane. That is, in the example of FIG. 1, system 2 includes management device 4 and enterprise network 20 in which network devices 6 represent network devices that have not yet been assigned to a security domain. In this example, enterprise network 20 includes various security domains 13 that may contain a variety of devices, firewalls, gateways, routers, switches and computing resources. In this example, network devices 10A-10C have been assigned to engineering domain 13A, network devices 12A-12C have been assigned to legal domain 13B, network devices 16A-16C have been assigned to accounting domain 13C, and network devices 18A-18C have been assigned to sales domain 13D.

Management device 4 performs various aspects of controlling the deployment of configuration data to network devices within enterprise network 20. During this process, management device 4 allows an administrator 68 to control the deployment of new network devices 6, including the assignment of network devices 6 to one or more security domains 13. In one example, administrator 68 interacts with a user interface presented by management device 4 to identify network devices, determine whether the network devices are currently assigned to one of security domains 13, and add, change, or remove devices within an enterprise network 20 to/from security domains 13. Further, management device 4 configures network devices within enterprise network 20 to add or remove the network devices to/from one or more security domains 13. In another example, management device 4 assigns network devices, for example an engineering network device 10A (e.g., a network device used by an engineer), to the engineering security domain 13A within enterprise network 20. Further details of example management devices and techniques for controlling managed devices can be found in U.S. patent applicant Ser. No. 12/688,635 by Kumbhari et al., "DYNAMIC OPTIMIZATION OF DEVICE MANAGEMENT COMMAND FOR BULK RETRIEVAL OF CONFIGURATION DATA," filed Jan. 15, 2010; U.S. patent application Ser. No. 12/755,269 by Singh et al., "ERROR HANDLING FOR DEVICE MANAGEMENT CONFIGURATION AND OPERATIONAL DATA RETRIEVAL COMMANDS," filed Apr. 6, 2010; and U.S. patent application Ser. No. 12/785,194 by Watsen et al, "PROACTIVE PURCHASE RECOMMENDATIONS REGARDING NETWORK LIMITATIONS," filed May 21, 2010, each of which is incorporated herein by reference in its entirety.

Enterprise network 20 includes, for example, a network of interconnected domains or subnets corresponding to different company sites, such as production sites, departments, business units, different offices or other sites in order to share computer resources and communications over the network. Enterprise network 20 also includes, for example, subnets of interconnected domains which include, for example, campus networks, wide area networks, virtual private networks, and other types of local or private area networks. Devices of enterprise network 20 communicate with devices of various domains, management device 4, and other network devices using a transmission medium, such as, for example, optical fiber, Ethernet, Wireless, or other transmission medium. Devices of enterprise network 20 utilize any of a set of communication protocols such as, for example, Internet Protocol (IP), Transmission Control Protocol (TCP), User Datagram Protocol (UDP), Asynchronous Transfer Mode (ATM), transmit and receive data across a packet-switched network. In this disclosure, network devices exchange data using the TCP/IP through the use of packets. The packets can be used in packet-based or packet-switched networks.

In one example, network devices of enterprise network 20 include any or all of web servers, database servers, file-servers, routers, printers, end-user computers, personal digital assistants (PDAs), handhelds, smart phones, tablet computers, or other devices. Management device 4 automatically locates these network devices 24 throughout the enterprise network 20 and configures the devices to add or remove the devices to or from one or more of security domains 13. Security domains 13 include, for example, Web applications, Kerberos, Virtual Private Networks, or other security domains. In one example, management device 4 receives requests from an administrator 68 to assign one of network devices 6 to a security domain 13.

In accordance with the techniques of this disclosure, management device 4 is configured to display a graphical user interface (GUI) having a two-dimensional data input plane to assign values (e.g., configuration attributes or parameters) to network devices (i.e., objects) within enterprise network 20. Management device 4 may display identifiers for the objects along an x-axis of a graph corresponding to the two-dimensional data input plane, and attributes along a y-axis of the graph. In the example of FIG. 1, the objects correspond to network devices 6, 10, 12, 16, 18, and the attributes correspond to security domains 13. In the example of FIG. 1, management device 4 is configured to display a graph having identifiers for various network devices along an x-axis of the graph and identifiers for security domains 13 along a y-axis of the graph.

Accordingly, while using management device 4, administrator 68 is able to readily identify security domains 13 to which various security domains network devices have been assigned. In one example, management device 4 is configured to render points on the graph to indicate network devices that are assigned to security domains 13. For example, with respect to FIG. 1, management device 13 displays a graph that displays points at the intersections of identifiers for network devices 10A-10C with an identifier for engineering domain 13A, intersections of identifiers for network devices 12A-12C with an identifier for legal domain 13B, intersections of identifiers for network devices 16A-16C with an identifier for accounting domain 13C, and intersections of identifiers for network devices 18A-18C with an identifier for sales domain 13D.

Moreover, to add a network device to one of security domains 13, administrator 68 can select an intersection of an identifier of the network device with an identifier for the one of security domains 13 to which administrator 68 wishes to add the network device. For example, to add network device 6 to engineering domain 13A, administrator 68 would locate the identifier for network device 6 along the x-axis of the graph, locate the identifier for engineering domain 13A along the y-axis of the graph, and select the intersection. Administrator 68 may select the point using a mouse, stylus, touchscreen display, light pen, or other input mechanism. Similarly, administrator 68 is able to remove devices from one of security domains 13 by selecting an existing point on the graph.

In response to adding a point to the graph, management device 4 adds the corresponding network device to the corresponding security domain. To do so, management device 4 may generate and sends configuration data to the network device to cause the network device to be added to the security domain. Likewise, management device 4 updates local configuration data (e.g., an internal configuration database of the management device) to indicate that the network device has been added to the security domain. Moreover, management device 4 sends configuration data to other devices that enforce the security domains, such as, for example, gateway devices, routers, switches, and firewalls. In this manner, the network device will be added to the security domain, such that the network device is able to communicate with other devices of the security domain.

For purposes of example, the techniques of this disclosure discussed with respect to FIG. 1 include assigning network devices to security domains. However, in general, the techniques of this disclosure may be applied in any context in which attributes are to be assigned to objects. These techniques may simplify the process of assigning attributes to a relatively large number of objects. For example, a computing device may implement the techniques of this disclosure to assign tags to digital pictures. In this example, the computing device is configured to display identifiers (e.g., file names or thumbnail representations) of the digital pictures along an x-axis of a graph and tags (e.g., "family," "friends," "me," "pets," "vacation," "work," and the like) along a y-axis of the graph. A user may tag a digital picture by selecting a point at the intersection of the desired tag and the picture. The techniques of this disclosure are generally applicable to any scenario in which a user is tasked with assigning attributes to various objects.

Thus, more generally, a computing device implementing the techniques of this disclosure, such as management device 4, displays identifiers for a set of objects along an x-axis of a graph and a set of values along a y-axis of the graph. The set of objects generally correspond to any object to which a user would assign attributes. The attributes correspond to the set of values displayed along the y-axis of the graph. As noted above, the set of objects may correspond to network devices, digital pictures, or other sets of objects. The set of values may correspond to tags for digital pictures, or for network devices, security domains, IP addresses, subnets, ports to use when communicating with a particular device, protocols to use when communicating with a particular device, an IP address of a device to communicate with (e.g., to perform task X, communicate with device Y), or other attributes.

Management device 4 also receives a selection of an intersection of one of the identifiers along the x-axis and one of the values along the y-axis. The intersection corresponds to a point directly above the identifier along the x-axis and directly beside the value along the y-axis. Management device 4 may receive the selection via a touchscreen, pointer controlled by a mouse when a button of the mouse is pressed, a light pen, a stylus, or with other input mechanisms.

After receiving the selected intersection, management device 4 assigns the selected one of the values to the one of the objects corresponding to the selected one of the identifiers. That is, management device 4 creates an association between the selected object and the selected value. For example, with respect to network devices and security domains, management device 4 assigns the selected network device to the selected security domain. As another example, with respect to digital pictures and tags, management device 4 associates the selected tag with the selected digital picture. In addition, management device 4 sends configuration data to the one of the objects to configure the one of the objects with the selected one of the values. In this manner, the selected object is assigned the selected value.

Management device 4 also implements various techniques for manipulating the graph for administrator 68. In some examples, management device 4 provides administrator 68 with search functions to search for particular objects on the graph. That is, management device 4, in some examples, is configured to receive search criteria for a particular object or a particular value (such as, for example, criteria for particular security domains 13 or network devices 6, 10, 12, 16, 18). Upon receiving the criteria, management device 4 updates the graph to display results satisfying the search criteria.

In some examples, management device 4 provides administrator 68 the ability to change a resolution of the graph, that is, to zoom in or zoom out so as to change the granularity for which the objects are displayed on the graph. Administrator 68 can submit a request to zoom in or zoom out, and management device 4 changes a resolution for the graph in accordance with the request. In response to a zoom-in request, management device 4 reduces the number of objects displayed on the graph. In response to a zoom-out request, management device 4 increases the number of objects displayed on the graph. Similarly, management device 4, in some examples, provides administrator 68 with the ability to scroll horizontally or vertically to change a region of interest of the graph for which corresponding devices are displayed within the screen. That is, administrator 68 is able to request to shift a focal position of the graph, and management device 4 shifts the focal position of the graph in accordance with the request.

Management device 4 may provide one or more advantages. For example, management device 4 may allow administrator 68 to configure a large number of devices, e.g., network devices 6. Further, administrator 68 need not know the details of each object (e.g., network devices 6) or potential value (e.g., security domains 13) to be assigned to an object, because management device 4 can be configured to automatically configure devices connected to the network. Also, administrator 68 need not know the location of each device or security domain, because management device 4 maintains data indicative of the devices and security domains. Management device 4 may be used to reduce the time needed to assign a large number of values to a multitude of objects. Moreover, management device 4 can be used to manage large numbers of network devices 6, as the techniques of this disclose generally scale well for assignments between large numbers of objects and values. In this manner, management device 4 may reduce the complexity of managing network devices, providing network security, and the operational costs associated with managing the devices of the network.

Figure 2:
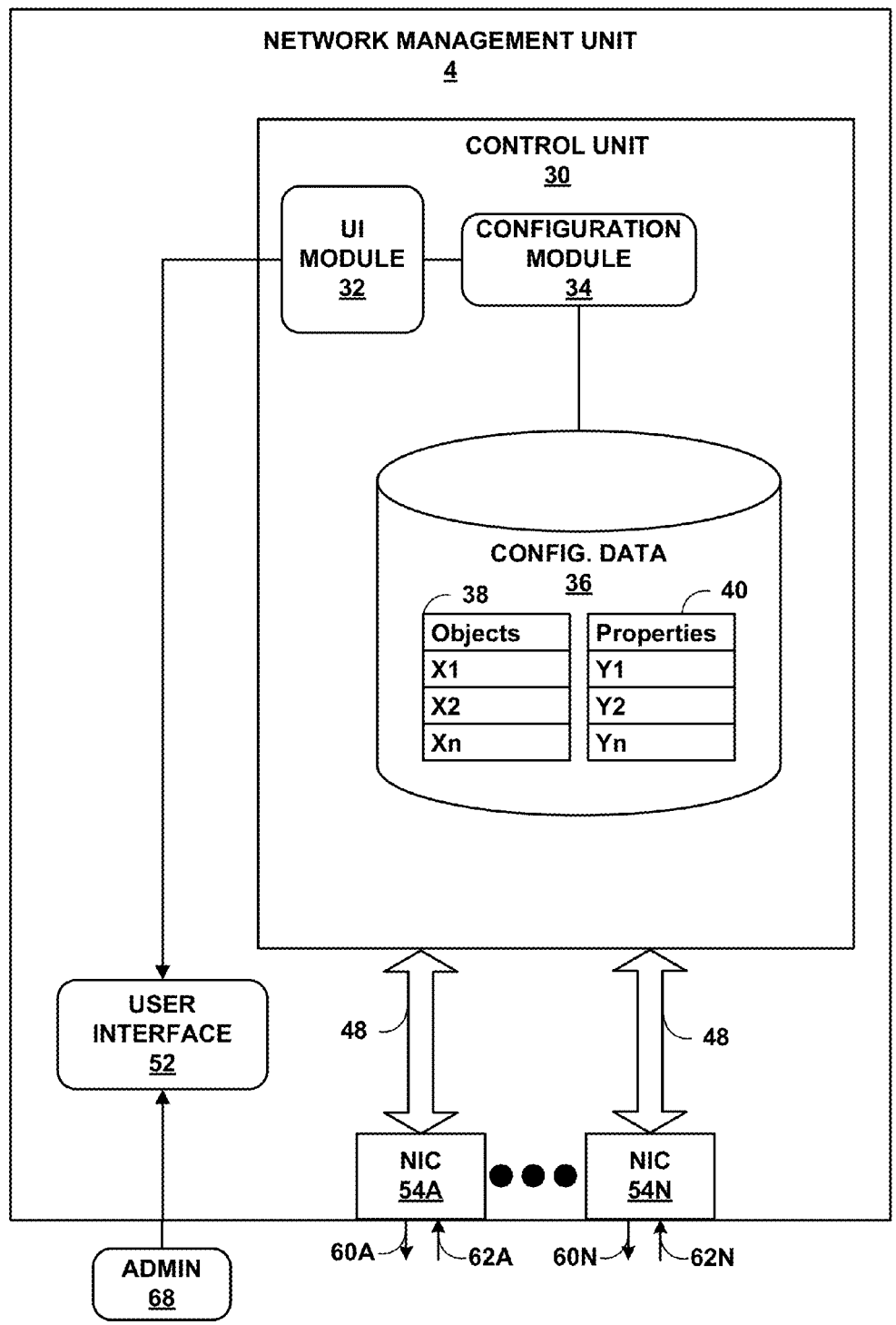
FIG. 2 is a block diagram illustrating an example arrangement of components of a management unit that implements the techniques of this disclosure.

FIG. 2 is a block diagram illustrating an example arrangement of components of a network management device that implements the techniques of this disclosure. For purposes of illustration, FIG. 2 depicts one example of components for network management device 4 of FIG. 1. In this example, network management device 4 includes control unit 30, user interface 52, and one or more network interface cards 54A-54N (NICs 54) for transmitting and receiving network communications 48 over links 60, 62. Network interface cards 54 provide physical interfaces for network management unit 4 to devices of a network, e.g., enterprise network 20 of FIG. 1, where the devices include any or all of, for example, gateways, bridges, switches, routers, hubs, end-user devices, PDAs, smart phones, printers, and servers, among other network devices. Although not shown, network management device 4 may include additional components as described in U.S. patent application Ser. Nos. 12/755,269 and 12/785,194, referenced above.

Control unit 30 provides an operating environment for configuration module 34 and user interface (UI) module 32. In one example, control unit 30 includes a computer-readable storage medium encoded with instructions for configuration module 34 and user interface module 32, and a processor to execute the instructions. Control unit 30 also provides repositories for configuration database 36. In one example, these repositories provide storage for information pertaining to network devices 6, 10, 12, 16, 18 and security domains 13 of FIG. 1.

In some examples, control unit 30 includes one or more microprocessors (not shown in FIG. 2) that execute software instructions, such as those used to define software or computer program, stored on a tangible, non-transitory computer-readable storage medium (not shown in FIG. 2). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 30 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Configuration module 34 retrieves information regarding network devices 6, 10, 12, 16, 18 and security domains 13 connected to or located within enterprise network 20 of FIG. 1. Configuration module 34 stores this information within configuration database 36. For instance, configuration module 34 transforms network topology information from the network devices and security domains 13 from enterprise network 20 in FIG. 1 and stores this information into configuration database 36. Administrator 68 may also, or alternatively, provide this information to be stored in configuration database 36. Configuration database 36 stores objects table 38 and properties table 40, where values of properties table 40 can be assigned to objects of objects table 38. Configuration database 36 also stores relationships between objects of objects table 38 and values of properties table 40, e.g., in the form of links, assignments, or other relationships. In one example, configuration module 34 retrieves the network topology from devices of enterprise network 20 via one or more network interface cards 54.

In one example, control unit 30 receives information describing objects and assignable values via configuration module 34. Objects table 38 and properties table 40 are generally configured as tables of a relational database, in the example of FIG. 2. Thus, configuration module 34 is able to query configuration database 36. Configuration database 36 includes, in some examples, IP addresses, MAC addresses, user identification information, or other information relating to network devices 6. Configuration database 36 stores information about network devices and security domains 13, e.g., media access control (MAC) address, internet protocol address, and authentication information.

Figure 3:
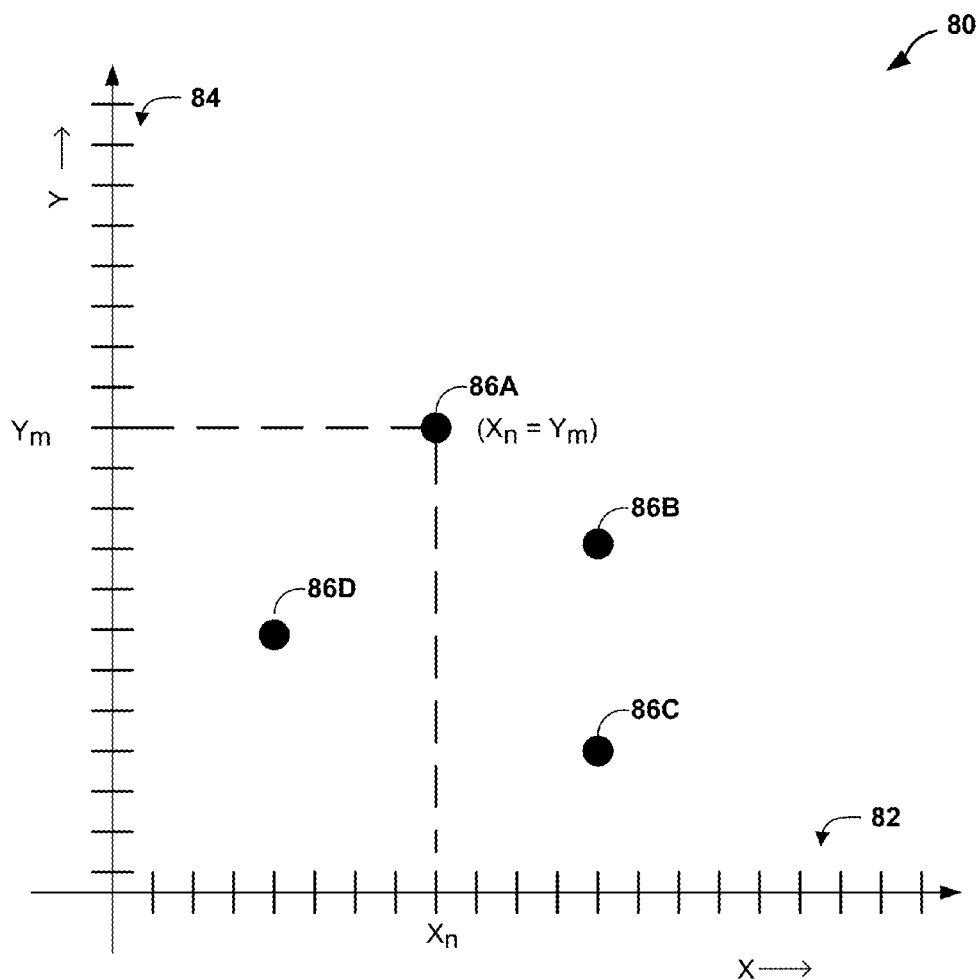
FIG. 3 is a conceptual diagram illustrating an example graph corresponding to a two-dimensional data input plane for assigning values to objects.

User interface module 32 causes user interface 52 to display a two-dimensional graph, identifiers for a set of objects along an x-axis of the graph, and a set of values along a y-axis of the graph, e.g., as illustrated in FIG. 3, discussed in greater detail below. User interface module 32 also renders points on the graph at intersections of network devices and security domains to which the network devices have been assigned. Administrator 68 may then observe assignments of network devices to security domains 13 from the rendered points. In addition, administrator 68 utilizes user interface 52 to assign or remove network devices 6, 10, 12, 16, 18 to/from security domains 13. In particular, when administrator 68 adds a point to the graph, User interface module 32 retrieves coordinates for the point, where the coordinates correspond to a particular device and a particular security domain. User interface module 32 then forwards the coordinate information to configuration module 34. After receiving the coordinates, configuration module 34 automatically updates configuration database 36 to assign the device to the security domain, pursuant to the received coordinates. In some examples, user interface 52 includes a graphical user interface, a web-based or web user interface, tactile interface, a touch user interface, or a gesture interface.

After receiving a new point, configuration module 34 updates configuration database 36 to indicate that the object for the point has been assigned the value for the point. In the example of FIG. 2, configuration module 34 updates configuration database 36 to indicate that one of network devices 6 corresponding to the point has been assigned to one of security domains 13 corresponding to the point. Additionally, configuration module 34 generates configuration data for the network device and sends the configuration data to the network device, to cause the network device to operate within the security domain.

In some example, administrator 68 enters search criteria via user interface 52, and user interface module 32 adjusts the displayed graph based on the search criteria. In particular, control unit 30 queries configuration database 36 using the search criteria to determine objects of objects table 38 and/or properties of properties table 40 that satisfy the search criteria. The full set of objects in objects table 38 may be referred to as a superset of objects, while the objects matching the search criteria may be referred to as a subset of the superset. Control unit 30 selects the subset of objects from the superset of objects such that each of the objects of the subset satisfies the search criteria. In some examples, administrator 68 submits a request via user interface 52 to change the resolution of the graph. In this manner, administrator 68 may submit a request to zoom-in, which reduces the number of objects displayed on the graph, or zoom-out, which increases the number of objects displayed on the graph. In some examples, administrator 68 submits a request via user interface 52 to shift the position of the graph. In another example, administrator 68 submits a request via user interface 52 to shift the graph horizontally or vertically. In response to the shift request, user interface module 32 shifts the graph in accordance with the request.

FIG. 3 is a conceptual diagram illustrating an example graph 80 corresponding to a two-dimensional data input plane for assigning values to objects. In the example of FIG. 3, graph 80 includes an x-axis 82 and a y-axis 84. Graph 80 also includes identifiers (e.g., "$X_n$") for objects along x-axis 82. Graph 80 also includes indications of values along y-axis 84. In the example of FIG. 3, graph 80 includes rendered points 86A-86D (points 86), corresponding to intersections between the objects and the attributes. Points 86 represent assignments of the values at the same vertical position as the points to objects at the same horizontal position as the points. In this example, graph 80 displays rendered points 86A-86D, where point 86A, for example, indicates an intersection of identifiers for object $X_n$ and attribute $Y_m$. In other words, point 86A being rendered indicates that value $Y_m$ has been assigned to object $X_n$.

In this manner, points 86 each represent an (x, y) pair. In accordance with the techniques of this disclosure, a point for an (x, y) pair is equivalent to saying that value y has been assigned to object x. In other words, plotting a point on graph 80, that is, an x-y plane, assigns value y to object x. Similarly, deleting a point from graph 80 can be performed to remove value y from object x. In this manner, a user, such as administrator 68, may add a network device to a security domain, for example, using a one-click assignment.

As discussed above, user interface 52, in one example, is configured to display a graph, similar to graph 80. Administrator 68 interacts with graph 80 via user interface 52. For example, administrator 68 may add a point to graph 80. User interface 52, illustrated in example FIG. 2, displays a rendered point indicating an intersection of identifiers for an object on x-axis 82 and an attribute on y-axis 84. Management device 4, illustrated in example FIG. 1, verifies an object and attribute is available to add to graph 80. For example, in verifying an available object, management device 4 identifies an available network device and determines whether the network device is assigned to a security domain. Moreover, management device 4 updates the configuration data for the identifiers of the object and attribute on graph 80. Further, user interface 52 updates graph 80 with points indicative of values assigned to objects, e.g., security domains 13 to which network devices have been assigned.

User interface 52 also receives one or more requests from administrator 68 to manipulate objects and attributes on graph 80. For example, administrator 68 may submit a search request to search for particular objects and/or values. User interface 52 selects a set of objects corresponding to a subset of a superset of objects, where the superset of objects corresponds to the full set of available objects, and control unit 30 selects the subset of objects as the objects satisfying the search criteria. Moreover, management device 4 updates user interface 52 to display the objects of the search criteria. The search criteria request can also search for attributes, identified points, assigned objects, and other items.

In another example, administrator 68 may request to change a resolution for the graph. Administrator 68 may request to zoom-in, such that changing the resolution includes reducing the number of objects displayed on graph 80. To execute the request from administrator 68, management device 4 for example configures user interface 52 to decrease the number of objects, attributes, points, and/or other items displayed on graph 80. Similarly, administrator 68 may request to zoom-out, such that changing the resolution includes increasing the number of objects displayed on graph 80 in accordance with the request. As yet another type of request, administrator 68 may request to shift a position of the graph, to pan graph 80 horizontally or vertically.

In accordance with the techniques of this disclosure, administrator 68 is able to select different points easily and assign a large number of objects to an equally large number of attributes. With a large number of points in the graph area, administrator 68 is able to more easily understand where each point is located and how values are assigned to objects. In this manner, users are able to easily traverse a graph, such as graph 80, to readily observe points on graph 80, in accordance with the techniques of this disclosure.

A computing device implementing the techniques of this disclosure displays identifiers for a set of objects along an x-axis of a graph and a set of values along a y-axis of the graph. The computing device also receives a selection of an intersection of one of the identifiers along the x-axis and one of the values along the y-axis. The intersection corresponds to a point directly above the identifier along the x-axis and directly beside the value along the y-axis.

Figure 4:
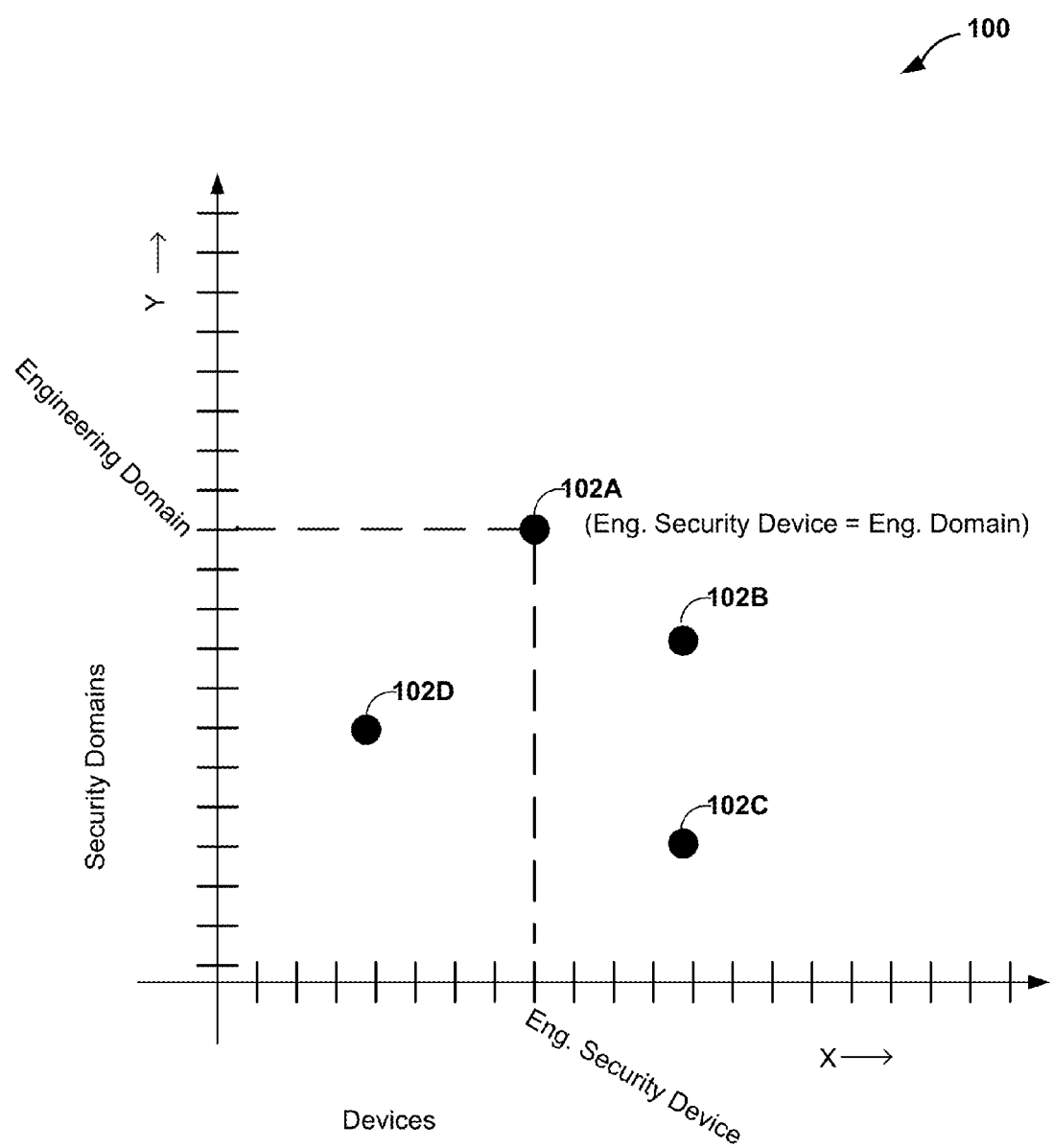
FIG. 4 is a conceptual diagram illustrating an example two-dimensional data input plane 100 for assigning an engineering device to an engineering security domain.

FIG. 4 is a conceptual diagram illustrating an example two-dimensional data input plane 100 for assigning an engineering device to an engineering security domain. In the example of FIG. 4, input plane 100 includes a graph with identified objects (devices) along an x-axis and attributes (security domains) along a y-axis. An example object is identified as a engineering security device and an example attribute is identified as engineering domain. Input plane 100 displays the graph with the corresponding engineering security device along the x-axis and the engineering domain along the y-axis. Moreover, the input plane displays identifiers for other devices along the x-axis and identifiers for other security domains along the y-axis, but for ease of illustration, FIG. 4 omits these identifiers.

In one example, a user plots point 102A to assign the engineering security device to the engineering domain. In this example, point 102A is displayed on the graph at the intersection of the identifier for the engineering security device and the engineering domain. The user may use a touchscreen, mouse, or some other input device to plot point 102A.

Points 102A-102D correspond to various security domains along the y-axis and devices along the x-axis, where the devices corresponding to the points are assigned to the security domains corresponding to the same points. Accordingly, a user may plot additional points to assign more devices along the x-axis to security domains along the y-axis. Likewise, a user may delete a point to remove a device from a security domain.

Figure 5A:
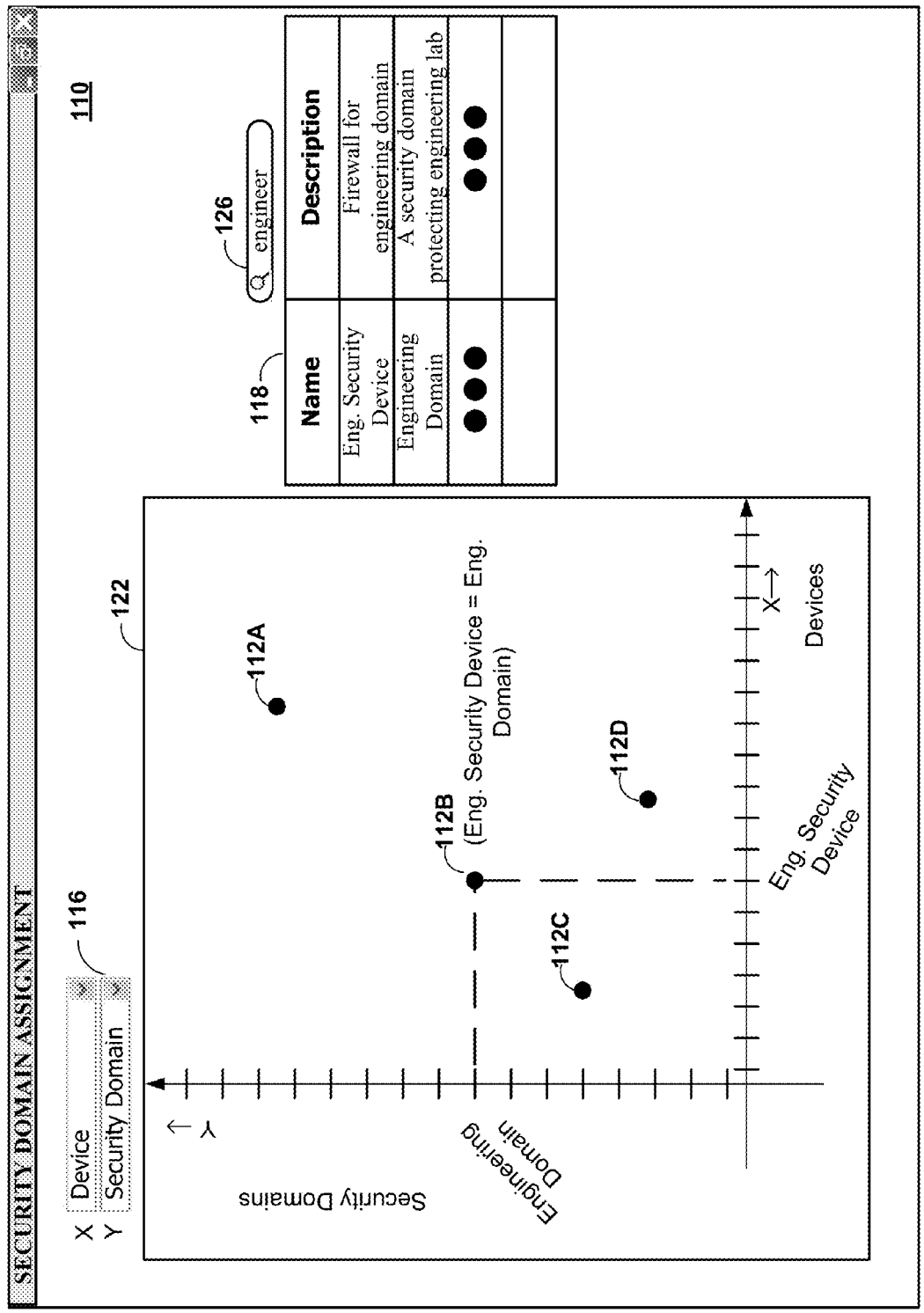
FIG. 5A is a screenshot of an example graphical user interface displaying a two-dimensional data input plane with various user options.

FIG. 5A is a screenshot of an example graphical user interface 110 displaying a two-dimensional data input plane 122 with various user options. Graphical user interface 110 includes drop-down lists 116 in the upper left hand corner, graph 122 displaying devices along the x-axis and security domains along the y-axis, and search text box 126 along with table menu 118. Table menu 118 presents identifiers for security domains and security devices that satisfy the search criteria of search text box 126. In this example, management device 4 provides identifiers for devices along the x-axis and the security domains along the y-axis. Moreover, graphical user interface 110 populates the graph with intersecting points corresponding to security domains and devices assigned thereto.

In some examples, management device 4 populates the drop-down lists 116 with one or more security domains in the y-category and devices in the x-category. In one example, the drop-down lists 116 provides the user with the ability locate identifiers on the graph and to isolate them to simplify the process of manipulating certain security domains or devices. Control unit 30 also populates the table menu 118, based on search criteria entered into search text box 126. Further, table menu 118 describes one or more devices and security domains.

In some examples, a user uses manipulates search table menu 118 by entering search criteria into search text box 126. User interface module 32 retrieves text entered into search text box 126 and queries devices and/or security domains of configuration data 36 to identify devices and/or security domains that satisfy the search criteria. User interface module 32 then causes user interface 52 to display the results that satisfy the search criteria in one or more places within graphical user interface 110, such as graph 122, drop-down menus 116, and/or table menu 118.

Figure 5B:
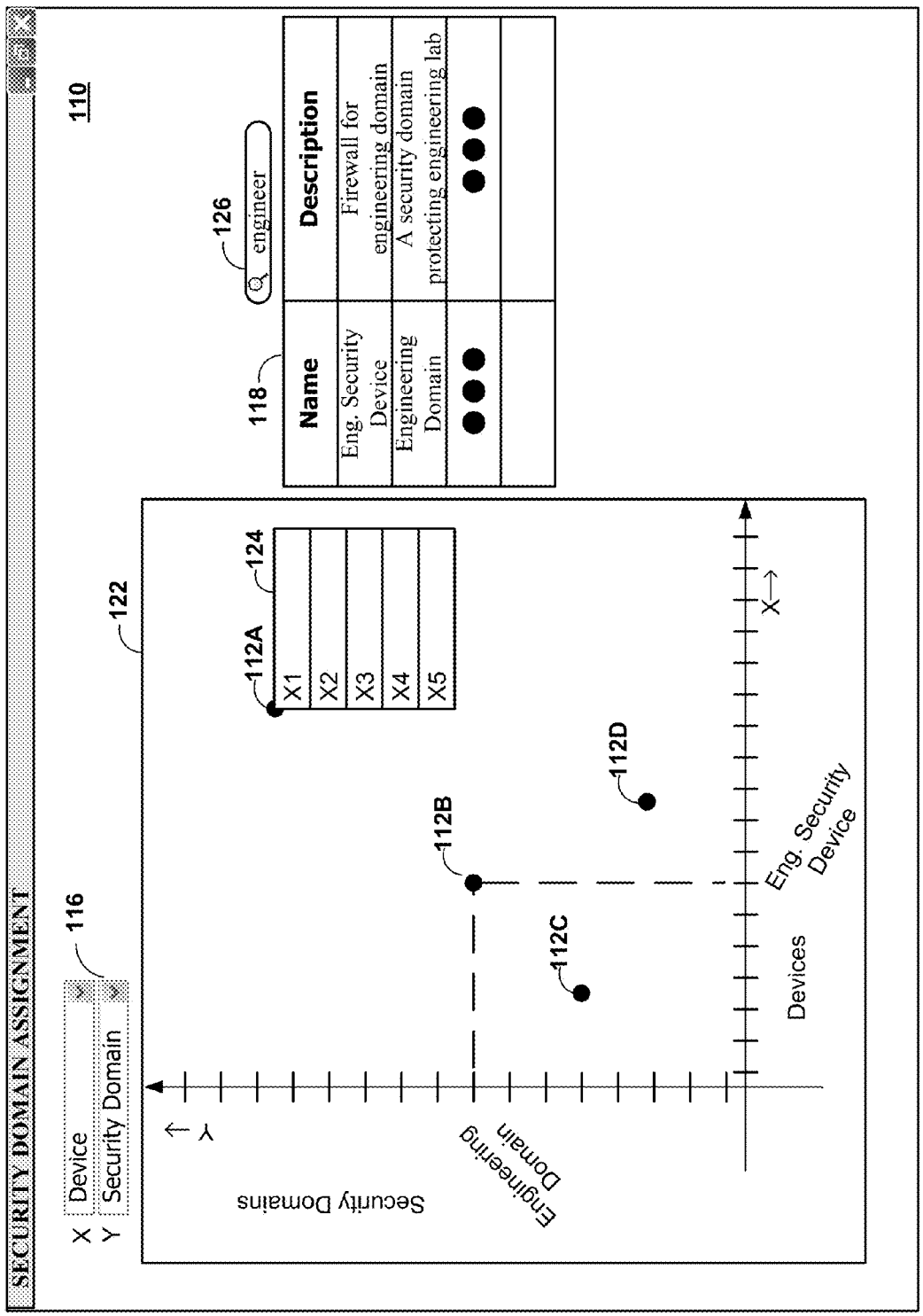
FIG. 5B is a screenshot of a graphical user interface displaying a two-dimensional data input plane presenting a drop-down menu in response to a user's selection of a point.

FIG. 5B is a screenshot of graphical user interface 110 displaying a two-dimensional data input plane 122 presenting a drop-down menu 124 in response to a user's selection of point 112A. In this example of FIG. 5B, two-dimensional data input plane 120 presents graph 122, drop-down lists 116, table menu 118, and search text box 126. In this example, user interface 52 presents drop-menu 124. Drop-down menu 124 provides additional assignment options for a user. In some examples, rather than assigning a value corresponding to a y-value of a point to an object corresponding to an x-value of the point, a user may create a relationship between an object corresponding to the x-value of a point and an object corresponding to the y-value of the point.

For purposes of example, the techniques of this disclosure discussed with respect to FIG. 5B include a drop-down menu corresponding to one point. However, in general, the techniques of this disclosure may be applied in any context in which one or more points display drop-down menus when a user selects a point. This technique may provide more information to a user about one or more points and how they correspond to objects, security domains, assignments, and other items. For example, a computing device may implement the techniques of this disclosure to assign tags to digital pictures. In this example, the drop-down menu of the point which a user may tag a digital picture may disclose the pictures' properties, the tag's properties, and other information. The techniques of the disclosure are generally applicable to any scenario in which a user is tasked with assigning attributes to various objects and has to select points on the graph.

The drop-down menu may contain a variety of values such as tags for digital pictures, or for network devices, security domains, IP addresses, subnets, ports to use when communicating with a particular device, protocols to use when communicating with a particular device, an IP address of a device to communicate with (e.g., to perform task X, communicate with device Y), or other attributes.

Figure 6:
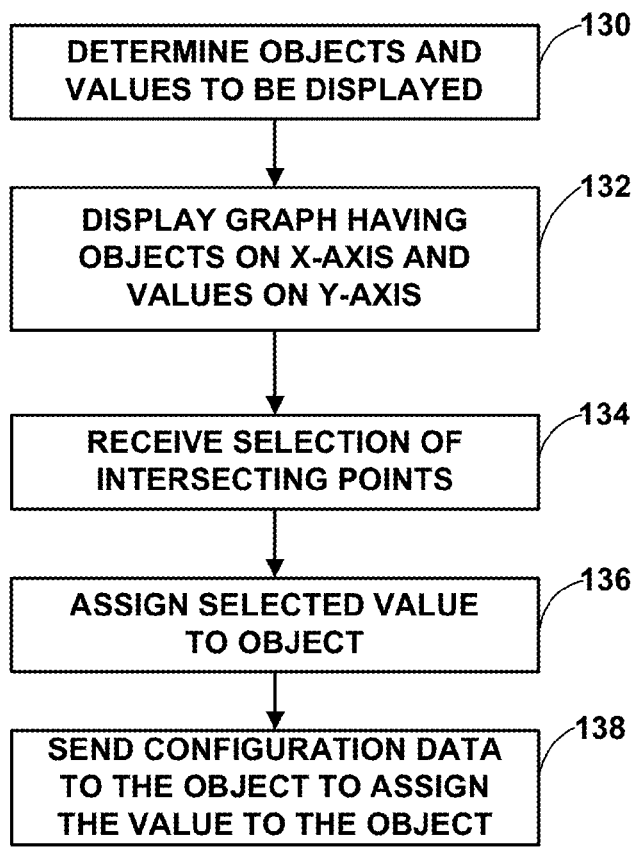
FIG. 6 is a flowchart illustrating an example method for assigning a value corresponding to a y-value of a point to an object corresponding to an x-value of the point.

FIG. 6 is a flowchart illustrating a method for displaying and assigning a value corresponding to a y-value of a point to an object corresponding to an x-value of the point. Although described primarily with respect to the components of management device 4 (FIGS. 1 and 2), it should be understood that generally any computing device can be configured to perform the techniques of FIG. 6.

Initially, management device 4 determines a set of objects to be displayed along an x-axis of a graph, and a set of values to be displayed along a y-value of the graph (130). For example, management device 4 may render a default graph of a default size with all or a predetermined subset of available objects and/or values to be displayed. Alternatively, management device 4 may receive search criteria and determine objects satisfying the search criteria. Management device 4 then renders a graph on a display of a user interface having identifiers for the objects along the x-axis and identifiers for the values along the y-axis (132).

Administrator 68 then selects a an intersection of an object along the x-axis and a value on the y-axis, which management device 4 receives (134). Management device 4 renders a point at the received intersection and also assigns the value corresponding to the point to the object also corresponding to the point (136). In some examples, management device 4 simply updates configuration database 36 to assign the value to the object. In examples for which the object itself must be updated, management device 4 also sends configuration data to the object to assign the value to the object (138). For example, for a network device assigned to a security domain, management device 4 sends configuration data to the device to cause the device to become operable within the security domain. As another example, for assigning a tag to a picture, management device 4 updates a digital file for the picture to add metadata representative of the tag to the digital file.

Figure 7:
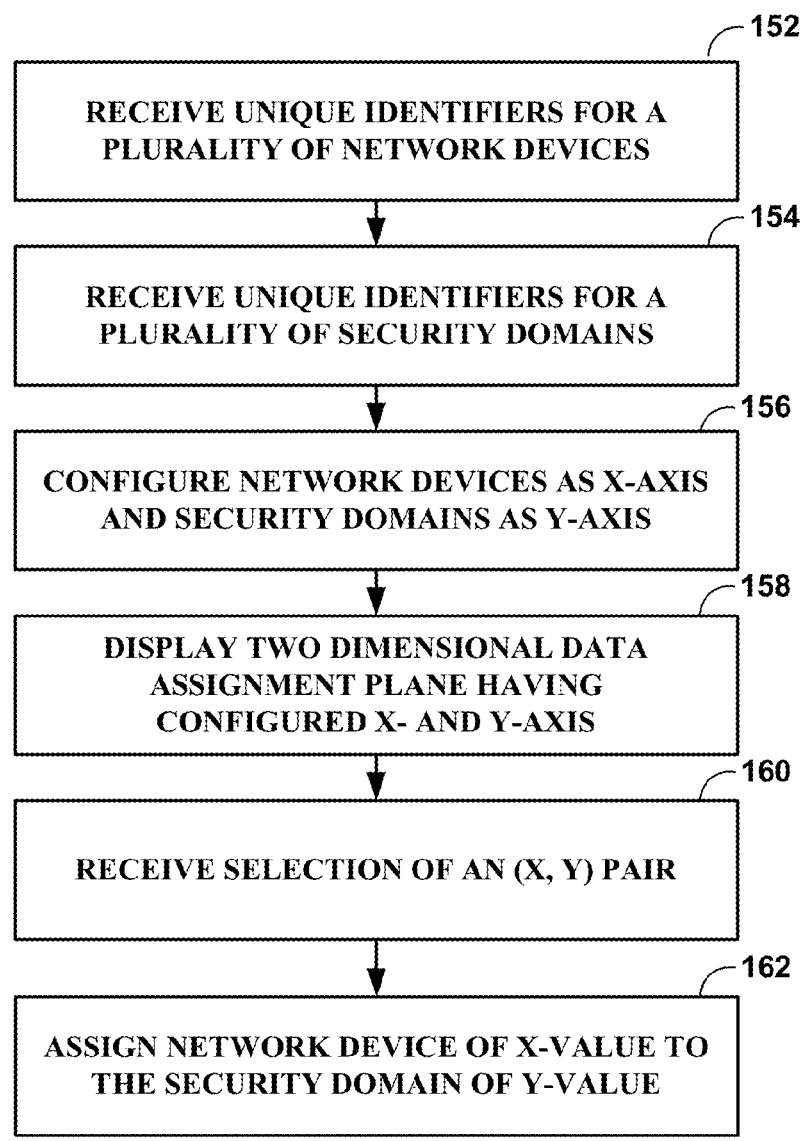
FIG. 7 is a flowchart illustrating an example method for assigning network devices to security domains.

FIG. 7 is a flowchart illustrating an example method for assigning network devices to security domains. FIG. 7 illustrates a particular example of the method of FIG. 6. As noted above, the techniques of this disclosure are directed to the use of a two-dimensional data input plane to assign values to objects, and are not limited to assignment of network devices to security domains. The method of FIG. 7 is intended as one example of the general concepts of this disclosure. As with the method of FIG. 6, the method of FIG. 7 may generally be performed by any computing device, although the example method is discussed with respect to management device 4 for purposes of example.

Initially, management device 4 receives identifiers for a plurality of network devices, such as network devices 6, 10, 12, 16, 18 (FIG. 1), which may or may not be currently assigned to security domains (152). In the example of FIG. 1, network devices 6 are not currently assigned to security domains 13, while network devices 10, 12, 16, and 18 are currently assigned to security domains 13. To receive the identifiers for the network devices, management device 4 may issue queries to the network requesting identifiers for the devices, or may receive the identifiers from administrator 68.

Likewise, management device 4 receives identifiers for a plurality of security domains, e.g., security domains 13 (FIG. 1).

Management device 4 then configures the network devices as the x-axis of a graph for a two-dimensional data input plane and the security domains as the y-axis of the graph (156). That is, management device 4 renders the graph such that identifiers for objects along the x-axis correspond to the network devices, while identifiers for the values along the y-axis correspond to the security domains. Management device 4 then displays the two-dimensional data input plane accordingly (158).

Management device 4 next receives a selection of a point on the graph (160). A point on a graph generally corresponds to an (x, y) pair. The x-value of the (x, y) pair, in this example, corresponds to a network device, while the y-value of the (x, y) pair corresponds to a security domain. In accordance with the techniques of this disclosure, receipt of an (x, y) pair generally indicates that the object corresponding to the x-value is to receive the value corresponding to the y-value. In some examples, management device 4 receives the (x, y) pair from a user, such as administrator 68, who plots the point on the graph using an input device, such as a mouse, keyboard, stylus, light pen, or other suitable input device.

In response to receipt of the point, management device 4 assigns the network device corresponding to the point to the security domain corresponding to the point (162). In some examples, this assignment includes updating configuration database 36 to indicate that the network device has been assigned to the security domain. In some examples, this assignment includes sending configuration data to the network device to cause the network device to become operable within the security domain. In some examples, the assignment includes both sending configuration data to the network device and updating configuration database 36. In this manner, the method of FIG. 7 includes assignment of a value to an object through the use of a two-dimensional data input plane, as an example of the techniques of this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transient computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
displaying, by a computing device, identifiers for a set of network devices along an x-axis of a graph and a set of values, corresponding to respective security domains, along a y-axis of the graph;
receiving a selection of an intersection of one of the identifiers along the x-axis and one of the values along the y-axis;
assigning the selected one of the values to the one of the network devices corresponding to the selected one of the identifiers; and
configuring the one of the network devices corresponding to the selected one of the identifiers to operate within the one of the security domains corresponding to the selected one of the values.

2. The method of claim 1, wherein the set of network devices comprises a subset of a superset of network devices, the method further comprising receiving a request for search criteria, and selecting the subset of network devices from the superset of network devices such that each of the network devices of the subset satisfies the search criteria.

3. The method of claim 1, further comprising receiving a request to change a resolution for the graph, and changing the resolution of the graph in accordance with the request.

4. The method of claim 3, wherein the request comprises a request to zoom-in, and wherein changing the resolution comprises reducing the number of identifiers for the set of network devices displayed on the graph in accordance with the request.

5. The method of claim 3, wherein the request comprises a request to zoom-out, and wherein changing the resolution comprises increasing the number of identifiers for the set of network devices displayed on the graph in accordance with the request.

6. The method of claim 1, further comprising:
receiving a request to shift a focal position of the graph; and
shifting the focal position of the graph in accordance with the request.

7. The method of claim 1, wherein receiving the selection comprises receiving a right mouse button selection of the intersection, the method further comprising displaying a drop-down menu in response to the right mouse button selection.

8. The method of claim 7, wherein the drop-down menu comprises a plurality of values, and wherein receiving the selection comprises receiving a selection of one of the values of the drop-down menu.

9. A device comprising:
- a user interface to display a graph, identifiers for a set of network devices along an x-axis of the graph, and a set of values, corresponding to respective security domains, along a y-axis of the graph;
- a computer-readable medium encoded with instructions for a configuration module and a user interface module; and
  - a processor to execute the user interface module to receive a selection of an intersection of one of the identifiers of the network devices along the x-axis and one of the values along the y-axis from the user interface, to execute the configuration module to assign the selected one of the values to the one of the network devices corresponding to the selected one of the identifiers, and to execute the configuration module to configure the one of the network devices corresponding to the selected one of the identifiers to operate within the one of the domains corresponding to the selected one of the values.

10. The device of claim 9, wherein the set of network devices comprises a subset of a superset of network devices, and wherein the processor is configured to execute a search module to receive a request for search criteria, and to select the subset of network devices from the superset of network devices such that each of the network devices of the subset satisfies the search criteria.

11. The device of claim 9, wherein the processor receives the selection as a right mouse button selection of the intersection, and wherein the processor is configured to cause the user interface to display a drop-down menu in response to the right mouse button selection, wherein the drop-down menu comprises a plurality of values, and wherein the processor is configured to receive a selection of one of the values of the drop-down menu.

12. A system comprising:
- a plurality of managed network devices; and
- a management device comprising:
  - a user interface to display a graph, identifiers for the plurality of managed network devices along an x-axis of the graph, and a set of values, corresponding to respective security domains, along a y-axis of the graph;
  - a computer-readable medium encoded with instructions for a configuration module and a user interface module; and
  - a processor to execute the user interface module to receive a selection of an intersection of one of the identifiers of the managed network devices along the x-axis and one of the values along the y-axis from the user interface, to execute the configuration module to assign the selected one of the values to the one of the managed network devices corresponding to the selected one of the identifiers, and to execute the configuration module to send configuration data to the selected one of the managed network devices to configure the selected one of the managed network devices to operate within the one of the security domains corresponding to the selected one of the values.

13. The system of claim 12, wherein the set of managed network devices comprises a subset of a superset of managed network devices, and wherein the processor is configured to execute a search module to receive a request for search criteria, and to select the subset of managed network devices from the superset of managed network devices such that each of the managed network devices of the subset satisfies the search criteria.

14. The system of claim 12, wherein the processor receives the selection as a right mouse button selection of the intersection, and wherein the processor is configured to cause the user interface to display a drop-down menu in response to the right mouse button selection, wherein the drop-down menu comprises a plurality of values, and wherein the processor is configured to receive a selection of one of the values of the drop-down menu.

15. A non-transitory computer-readable storage medium comprising instructions for causing a programmable processor to:
- display identifiers for a set of network devices along an x-axis of a graph and a set of values, corresponding to respective security domains, along a y-axis of the graph;
- receive a selection of an intersection of one of the identifiers along the x-axis and one of the values along the y-axis;
- assign the selected one of the values to the one of the network devices corresponding to the selected one of the identifiers; and
- configure the one of the network devices corresponding to the selected one of the identifiers to operate within the one of the security domains corresponding to the selected one of the values.

* * * * *